Oct. 25, 1966 H. R. OETERS ETAL 3,281,793

SELECTIVE MODIFICATION OF SEQUENTIALLY SCANNED CONTROL WORDS INCLUDING DELAY-CORRECTION APPARATUS

Filed Oct. 15, 1962 6 Sheets-Sheet 1

INVENTORS
HAROLD R. OETERS
REID A. HEASSLER
BY Gunter A. Hauptman
ATTORNEY

Oct. 25, 1966 H. R. OETERS ETAL 3,281,793

SELECTIVE MODIFICATION OF SEQUENTIALLY SCANNED CONTROL WORDS INCLUDING DELAY-CORRECTION APPARATUS

Filed Oct. 15, 1962 6 Sheets-Sheet 2

MULTIPLEXING CHANNEL ADAPTER MCA-A

MESSAGE SOURCE 1

Oct. 25, 1966 H. R. OETERS ETAL 3,281,793

SELECTIVE MODIFICATION OF SEQUENTIALLY SCANNED CONTROL WORDS INCLUDING DELAY-CORRECTION APPARATUS

Filed Oct. 15, 1962 6 Sheets-Sheet 3

LINES SCANNED DURING ONE SCAN

| CHANNELS SCANNED AND LINES SELECTED | | A1 B1 C1 | A2 B2 C2 | A3 B3 C3 | A4 B4 C4 | A5 B5 C5 | A6 B6 C6 | A7 B7 C7 | A8 B8 C8 | A9 B9 C9 | A10 B10 C10 |
|---|---|---|---|---|---|---|---|---|---|---|---|
| NO. OF t18 OCCURRENCES / LINE SCAN NO. | 1 | 1 A1 | 2 | 3 | 4 B4 | 5 | 6 | 7 C7 | 8 | 9 | 10 A10 |
| | 2 | 11 | 12 | 13 B3 | 14 | 15 | 16 C6 | 17 | 18 | 19 A9 | 20 |
| | 3 | 21 | 22 B2 | 23 | 24 | 25 C5 | 26 | 27 | 28 A8 | 29 | 30 |
| | 4 | 31 B1 | 32 | 33 | 34 C4 | 35 | 36 | 37 A7 | 38 | 39 | 40 B10 |
| | 5 | 41 | 42 | 43 C3 | 44 | 45 | 46 A6 | 47 | 48 | 49 B9 | 50 |
| | 6 | 51 | 52 C2 | 53 | 54 | 55 A5 | 56 | 57 | 58 B8 | 59 | 60 |
| | 7 | 61 C1 | 62 | 63 | 64 A4 | 65 | 66 | 67 B7 | 68 | 69 | 70 C10 |
| | 8 | 71 | 72 | 73 A3 | 74 | 75 | 76 B6 | 77 | 78 | 79 C9 | 80 |
| | 9 | 81 | 82 A2 | 83 | 84 | 85 B5 | 86 | 87 | 88 C8 | 89 | 90 |

3,281,793

SELECTIVE MODIFICATION OF SEQUENTIALLY SCANNED CONTROL WORDS INCLUDING DELAY-CORRECTION APPARATUS

Harold R. Oeters and Reid A. Heassler, Poughkeepsie, N.Y., assignors to International Business Machines Corporation, New York, N.Y., a corporation of New York Filed Oct. 15, 1962, Ser. No. 230,643
11 Claims. (Cl. 340—172.5)

This invention relates to electronic apparatus. More particularly, this invention relates to circuits, in data processing apparatus, which compensate for delays in the processing of data.

In electronic data processing apparatus, including electronic message switching exchanges, information represented by electronic signal pulses is typically arranged into "bits," "characters," "words" and "messages." Each character is made up of several binary (bit) representative signals, several characters forming a word and one or more words forming a message. Words may have many meanings. For example, in a message switching exchange, a word may have at least two general meanings: control and data. Control words are each associated with one telegraph line (of the many connected to an exchange) and specify bits of a message received from (or to be sent on) that line, indicate the progress of message reception and transmission, identify destinations for the bits, etc. Data words, on the other hand, usually specify only characters of messages and are not necessarily associated with any particular line. A typical message switching exchange is disclosed in three sources, which are incorporated herein by this reference: U.S. patent application Ser. No. 196,671, filed May 22, 1962, now Patent No. 3,241,125, "Memory Allocation," R. M. Tomasulo et al.; U.S. patent application Ser. No. 198,841, filed May 31, 1962, "Synchronizing Apparatus," J. R. Kersey et al.; and U.S. patent application Ser. No. 230,408, filed Oct. 15, 1962, "Character Assembly and Distribution Apparatus," C. H. Gilley et al., all assigned to the International Business Machines Corporation. This invention is intended for use in a broad range of devices (including computers, automatic reservation systems, editing machines, etc.) of which the above-referenced message switching exchange is cited only as an example for purposes of convenient exposition.

In message switching exchanges of the type referenced, a plurality of remote telegraph terminal units are connected by telegraph lines to a central message processing and routing apparatus. It is the function of the central apparatus to receive sequential bit-representative signals from the lines, assemble the bits into characters (and subsequently into words and messages) associated with the source line, perform additional processing (if any) upon the assembled information and finally re-transmit the assembled and processed message bit-by-bit on proper ones of the lines. In modern message switching exchanges one (or more) "control words" are associated with each line for holding data bits and control information relevant to the associated line. Such a control word may, for example, have provision for holding a portion of one character (being assembled or being transmitted) as well as indicating by "tags" whether the associated line is transmitting, receiving, etc. It is common practice to examine ("scan") the lines, and therefore the corresponding control words, in sequence; each control word being as a result "available" for an interval determined by the scan rate. During the examination of a control word it may occur that one or more bits of the control word are to be added to, changed or removed from, the word; or, a bit may be removed from, operated upon and returned to the word. If the time required to perform the operation upon the control word (for example, remove one bit, forming part of a character being transmitted and replace it with the next bit of the character) is less than the rate at which the lines are examined the operation may be performed without difficulty while the control word is available to the message switching exchange. If, however, the operation to be performed takes longer than the rate at which control words are available, then a portion of the operation (in the example, supply of the replacement bit) must be performed at a time when the associated control word is no longer available. To put the example another way, if the control word is available for an interval less than the time required to transmit a bit, request a new replacement and supply the new bit, the new bit will be supplied when another, unrelated, control word is available to the message switching exchange.

A lack of relationship between supplied bits and currently available control words is compensated for in the prior art by providing storage means for holding supplied bits until they can be placed into their corresponding control words. Since at least one bit in each control word may be operated upon, at least one store must be provided for each line. If more than one bit in a control word is to be processed, a separate store must be provided for each bit. Therefore, in the prior art, if there are N lines (and thus N control words) connected to a message switching exchange, there must be provided N storage devices for holding bits until they can be associated with their corresponding control words. If M bits in each control word are operated upon by the message switching exchange, then there must be provided $N \times M$ storage devices for each message switching exchange.

It is an object of this invention to reduce the number of storage devices necessary to insure a relationship between supplied bits and corresponding control words.

Another object of this invention is to provide apparatus for performing positional corrections necessitated by delays in processing.

Still another object of this invention is to provide inexpensive apparatus permitting overlapped processing of individual operands at a rate slower than the availability of successive operands.

A further object of this invention is to associate, with their corresponding sequentially available words, data bits which are supplied out of sequence with said corresponding control words.

These objects are attained in the apparatus of this invention by means of logic having a single storage device (in the simplest case) for each group of lines connected to a message switching exchange. Control words are stored in time-position sequence in a serial memory from which each control word is available at a time corresponding to the interval when its associated line is scanned. Due to operation of the circuits interconnecting the input (write) and output (read) of the serial memory, the bits of a control word currently being written into the memory do not necessarily form part of the control word currently being read from the serial memory. Usually there is a one-(or even more) word delay between reading and writing; for example, if the bits of word N are being read, the bits of word $N-1$ are being written. In the apparatus of this invention provision is made for switching a bit from its normal path through the logic to a logic by-pass route. As a result, a selected bit read from memory as part of control word N may by-pass the logic and be written into memory immediately as part of control word $N-1$; the balance of the bits in control word N being passed through the normal logic and written into memory in the time-position assigned to control word N. Since it is assumed that the time necessary to operate upon a bit associated with a control word is longer than the interval during which the control word is available, the bit will be supplied at a time position (of a "wrong" control word) which does not correspond to its control word. In the apparatus of this invention, a new bit (which may be a processed bit, a signal to change a bit or a completely new bit) requested at the time position of its associated control word is placed upon its arrival into the current ("wrong") control word in a bit position (of several) set aside in every control word for the purpose of receiving "wrong" bits. The next time that this "wrong" control word is available the new bit in the "wrong" position is sent into the by-pass route placing it into the adjacent preceding control word in still another "wrong" bit position set aside for this purpose. In this manner the bit is repeatedly moved via the by-pass route from the "wrong" bit position in one "wrong" control word to another "wrong" bit position in the preceding "wrong" control word. Eventually the bit will appear in the "correct" bit position of the "correct" control word, the contents of which position are always passed through the logic and never through the by-pass route. Thus the new bit will remain associated with the "correct" control word until used. It is obvious that the same principle applies in other cases such as the removal of a bit from a word, which bit is operated upon and subsequently returned.

The foregoing and other objects, features and advantages of the invention will be apparent from the following more particular description of the preferred embodiment of the invention, as illustrated in the accompanying drawings.

In the figures:

FIGURE 1 is a block diagram showing a system in which the invention may be embodied.

FIGURE 2*a* is a logic diagram showing a representative one of the multiplexing channel adapters of FIGURE 1 in more detail.

FIGURE 2*b* is a block diagram showing the message source of FIGURE 1 in more detail.

FIGURE 3*a* is a generalized block diagram functionally showing the serial memory of FIGURE 2*a*.

FIGURE 3*b* is a logic diagram showing the correction control of FIGURE 2*a*.

FIGURE 4*a* is a table showing a timing relationship which may exist among the scanners shown in FIGURE 1.

FIGURE 4*b* is a pulse diagram showing signals present during operation of the system shown in FIGURE 1.

FIGURES 4*c* and 4*d* together form a table illustrating operation of the invention.

GENERAL DESCRIPTION

Referring to FIGURE 1, a message switching system embodying the invention will be briefly described. The system is, for purposes of explanation only, similar to the one described in the above referenced U.S. patent applications. For simplicity it will be assumed that the message switching exchange of FIGURE 1 is acting only to send information on to a plurality of lines, the principles of the invention being identical also for the receipt of information and the change of information.

The message switching exchange may "simultaneously" send different information from a message source 1 to any number of remote telegraph printers (not shown) by placing signals on those of the lines L–A1 through L–A10, L–B1 through L–B10 and L–C1 through L–C10 which are connected to the desired printers. Signals are not literally transmitted "simultaneously" on all lines, though in effect the transmission apears to be simultaneous when compared with the speed of operation of the remote telegraph printers. In fact, however, transmission is made in a strict sequence determined by the positions of a channel scanner CS and three line scanners LSA, LSB and LSC. The position of the channel scanner CS determines which one of the three line groups A, B and C a bit will be placed on, whereas the line scanner LSA, LSB or LSC associated with the line group selected by the channel scanner CS determines the particular line the new bit will be placed on. The channel scanner CS selects a line group A, B or C in accordance with its position relative to the three terminals T–A, T–B and T–C. A bit will be placed upon the corresponding one of the channels CH–A, CH–B and CH–C connecting the channel scanner to a corresponding multiplexing channel adapter MCA–A, MCA–B or MCA–C (explained with reference to FIGURE 2*a*), each one of which stores one (or more) bits associated with each line in its group. The particular multiplexing channel adapter connected to the channel selector CS will then apply a bit to the corresponding one of the line scanners LSA, LSB or LSC. Depending upon the position of the corresponding line scanner, a bit from the connected multiplexing channel adapter will be placed on one of the ten lines in the group connected to the line scanner. For example, if the channel scanner CS is set to terminal T–A, channel A and, as a result, multiplexing channel adapter MCA–A is selected. If the line scanner LSA is set to terminal T–A1, a bit will be applied by the multiplexing channel adapter MCA–A to line L–A1, that is, to line 1 in line group A.

The channel scanner CS and the line scanners LSA, LSB and LSC are stepped by signals on lines 9 and 15 respectively, at times calculated to permit bits to be sent on the lines at regular intervals. The channel scanner CS is, in this embodiment, stepped once for every third step of the line scanners LSA, LSB, and LSC (which step in synchronism). However, a bit is transmitted by a multiplexing channel adapter only on the first line, of the three lines, selected by its associated line scanner during the time that its channel is specified by the channel scanner. As will be explained with reference to the table of FIGURE 4, the order of line selection is: A1, A2, A3, B4, B6, C7, etc., but bits are actually sent onto only the first selected line in each selected group in the order: A1, B4, C7, etc. It is obvious that many other orders of transmission are possible.

Whenever a bit is sent onto a line by one of the multiplexing channel adapters MCA–A, MCA–B and MCA–C a new bit is automatically requested from a message source 1, as replacement for the transmitted bit. Stepping of the channel scanner CS and the line scanners LSA, LSB and LSC, transmission of bits by multiplexing channel adapters MCA–A, MCA–B and MCA–C and requests for new bits from the message source 1 are all controlled by circuits operated in accordance with an oscillator 21, which may be constructed in accordance with any one of many prior art circuits. Regularly spaced signals from the oscillator 21 are placed on line 20 to control stepping of a standard binary clock ring circuit 19 from state to state. The clock ring 19 initially places a signal on output *t*1 (at time *t*1) and subsequently places signals on outputs *t*2 through *t*20 (at times *t*2 through *t*20 respectively), after which (at time *t*20) a signal again appears at output *t*1. The outputs *t*1 through *t*20 are connected to cable 22 which is made available to the multiplexing channel adapters MCA–A, MCA–B, and MCA–C. The output *t*18 is connected via line 15 to a counter ring 14 (similar to the clock ring 19) which is as a result advanced one position at every time *t*18. After every third signal *t*18, the ring is stepped from its third position to its first position. Therefore, for every third signal at input 15 to counter ring 14, there will be a signal at output 9. The signal on line 9 is used to step the channel scanner CS one position, while the signal on line 15 is used to simultaneously step all three line scanners LSA, LSB, and LSC one position. The line scanners LSA, LSB and LSC as a result are stepped three times for every single step of the channel scanner CS.

Operation of one multiplexing channel adapter MCA–A, MCA–B or MCA–C to transmit a bit and a request for a new bit from the message source 1 are initiated immediately after each step of the channel scanner CS by means of well known AND circuits 5, 6, 7 and 8 which are enabled by the step channel scanner signal on line 9. A transmit ring 13, which is stepped at time *t*18 by the counter ring 14 output 9 in synchronism with the channel scanner CS, selects one output TMT-A, TMT-B or TMT–C from a corresponding one of AND circuits 6, 7 or 8. This causes the one multiplexing channel adapter MCA–A, MCA–B or MCA–C currently selected by the channel scanner CS to be activated and to transmit (at the first time *t*20 following stepping of the channel scanner CS) a bit to a line in its group. The first *t*20 signal following the stepping of the channel scanner CS also causes a request for a new bit (to replace the one transmitted) to be placed on request new bit line 3 of the message source 1. At every *t*7 time, the AND circuit 4 is enabled to transfer a new bit, if any, from the message source 1 output 2 to the multiplexing channel adapter currently selected by the channel scanner CS. A new bit corresponding to the control word for which it was requested will not emerge on line 2 of the message source 1 until a time *t*7 occurring (in this embodiment) two cycles of the clock ring 19 after the request was made. This occurs because the message source 1 is unable to immediately provide a new bit on line 2 in response to the request on line 3. For example, assume that the counter ring 14 has (at time *t*18) been stepped to its third position. During the subsequent time *t*20, for example, a bit will be sent on line L–A1 and simultaneously a request for a new bit for line L–A1 will be made to the message source 1 on request new bit line 3. Due to the inherent delays in the message source 1 a corresponding new bit will not emerge on new bit line 2 until several cycles of the clock ring 19 later when the counter ring 14 is at its second position. At this time the channel scanner CS still selects multiplexing channel adapter MCA–A but the line scanners now select lines L–A3, L–B3 and L–C3. Thus, the new bit for line L–A1 is at time *t*7 sent via the channel scanner CS to the "correct" multiplexing channel but at a time when its line scanner LSA is selecting the "wrong" line L–A3. As will be immediately explained with reference to FIGURE 3*a*, "control words" internal to the multiplexing channel adapters are available sequentially one at a time in synchronism with the line currently selected by the associated line scanners. This causes a new bit destined for line N to enter the multiplexing channel adapter at a time (in this embodiment) when the control word corresponding to line $N+2$ is available.

Referring now to FIGURE 3*a*, a circulating delay line memory 23 shown for the multiplexing channel adapter MCA–A is also provided in each one of the multiplexing channel adapters MCA–B and BCA–C. Any type of serial, or sequentially accessed non-serial, memory may be utilized, the well-known delay line type of memory being shown for purposes of illustration only. The memory 23 has provision for dynamically "storing" several 10-bit control words, each word corresponding to one of the ten telegraph lines L–A1 through L–A10 connected to the multiplexing channel adapter MCA–A. The control words serially circulate through the delay line 23 and associated logic circuits 26 at the same rate that the corresponding line scanner LSA "looks" at (scans) the lines L–A1 through L–A10. It is, in this specific example only, assumed that the memory 23 "stores" (at any given time) nine complete control words plus one bit of a tenth control word, and that logic 26 has room for nine bits of the tenth control word. Therefore, one control word for each one of the ten lines L–A1 through L–A10 is stored in the circuit formed by the memory 23 and logic 26. Circulation (clockwise) of control words in this circuit is coordinated with the operation of the associated line scanner LSA, to insure that the scanner remains set to a terminal for an interval long enough to permit every bit of its corresponding control word to be written into the memory 23 from the logic 26 via a line 36. During this same interval, eight bits of the control word corresponding to the next line to be scanned and two bits of the current control word are read into the logic 26 from the memory 23 via the line 43. (See FIGURES 4*c* and 4*d* discussed in more detail below.) For example, as is shown in FIGURE 3*a*, six bits of the control word for line L–A10 and three bits of the control word for line L–A9 may be present in the logic 26 at a single time. Bit 6 of the control word for line L–A10 is read from the memory 23 during the same "memory cycle" that bit 8 of the control word for line L–A9 is written into the memory 23. A "memory cycle" is here defined as the time necessary to read one bit from, and write one bit into, the memory 23. If each time pulse from the clock ring 19 is allotted to either reading or writing, two time pulses will equal a memory cycle. If both reading and writing occur simultaneously, one time pulse equals a memory cycle. For the embodiment of the invention disclosed herein, all odd-numbered time pulses are arbitrarily set aside for reading bits and all even-numbered time pulses are arbitrarily set aside for writing bits, a memory cycle comprising an odd-numbered time pulse followed by an even-numbered time pulse.

Still referring to FIGURE 3*a*, a switch SW (functionally illustrative of an action performed by correction controls 30, explained below) is closed at times when bit positions 6, 8 and 10 of control words are read from the memory 23 on line 43. (Reference to FIGURES 4*c* and 4*d* indicates that these are the odd-numbered time pulses *t*11, *t*15 and *t*19.) The effect of the switch SW is to cause every control word's bit position 6, 8 and 10 to bypass the logic 26 and to be written into the memory 23 during the next write time (even-numbered time pulses *t*12, *t*16 and *t*20). As previously mentioned, the logic 26 normally results in an 8-bit delay between reading and writing, so that the bit being written during the even-numbered time pulse of a memory cycle and the bit read during the odd-numbered time pulse of the same memory cycle may belong to different control words. For example, in FIGURE 3*a*, if the contents of bit position 6 of the control word for line L–A10 is written into the memory 23 during the same cycle in which it was read, it will be written into bit position 8 of the control word for line L–A9. During the next complete circulation (equal to a scan cycle) of the contents of memory 23, bit 8 of the control word for line L–A9 will be written into bit 10 of the control word for line L–A8 and during the following complete circulation bit 10 of the control word for line L–A8 will be placed into bit position 2 of the same control word. This situation is intentionally introduced to shift bits from a "wrong" control word to a "correct" control word. Thus, when a new bit (intended for a control word N bit position 2) is provided by the message source 1 at a time causing it to be associated with a "wrong" control word (for example, word $N+2$ bit position 6), the new bit will be shifted during several successive scan cycles to its correct position (word N bit position 2). The amount of shift indicated is of course only illustrative.

Referring to FIGURES 4*c* and 4*d*, the relationships of time pulses from the clock ring 19 and control words read from and written into the memory 23 are tabulated. The letter N may represent any line in any one of the groups A, B and C. For example, bit position 1 of control word N is read at time *t*1 during the scan of line $N-1$. If, during the same memory cycle it is rewritten (at time *t*2) into the memory 23, it will be written into bit position 3 of control word $N-1$. The effect of the correction switch SW of FIGURE 4*a* is shown in FIGURES 4*c* and 4*d* by the lines interconnecting circled numbers, the contents of every one of bit position 6, 8 and 10 being moved during each scan to bit position 8, 10 and 2, respectively, of the previous control word.

The operation of the apparatus shown in FIGURES 1 and 3*a* will be generally explained with reference to FIGURES 4*c* and 4*d*. It is assumed that at every third *t*20 time a bit is sent onto one line by the multiplexing channel adapters from a bit position 2 of a control word corresponding to one line. When a bit has been sent from bit position 2 of a control word a new bit is immediately (at time *t*20) requested from the message source 1 by means of a signal on the line 3. This new bit is not however made available until a later time when the control word corresponding to another line is available.

Referring to FIGURE 1, at time *t*18 the channel scanner CS is stepped to select multiplexing channel adapter MCA–A and the associated line scanner LSA is stepped to line L–A1. In FIGURES 3*a* and 4*c*, bit position 2 of the control word (assuming that $N=1$) for line L–A1 in MCA–A is sent onto the line L–A1 at time *t*20. A new bit for line L–A1 is requested from the message source 1 at time *t*20 to replace the one just sent from bit position 2. Referring to FIGURES 1 and 4*d*, a new bit for line L–A1 bit position 2 is made available on new bit line 2 by the message source 1 (at time *t*7) after the line scanner LSA has been stepped twice (to line L–A3) and just before bit position 6 of the control word for line L–A3 is to be written into the memory 23. The new bit intended for the line L–A1 control word bit position 2 will be "erroneously" written into bit position 6 of the control word for line L–A3. After the scanner LSA has completely scanned its ten line and again scans line L–A2, bit position 6 of the control word corresponding to line L–A3 will be read from memory 23. When bit position 6 of any control word is read from the memory 23 it is automatically by-passed through switch SW around the logic 26 and entered into bit position 8 of the preceding control word (the control word for line L–A2 in this case). The scanner LSA continues to scan all ten of its lines, bit position 8 of the control word for line L–A2 being again read from memory 23 as the line scanner LSA returns to scan line L–A1 for the third time. At each time *t*15 bit position 8 of the current control word (which is in this case the control word for line L–A2) is read from the memory 23 and routed around the logic 26 by the switch SW to be written at time *t*16 into bit position 10 of the preceding control word (for line L–A1 in this case). Bit position 10 of the control word for line L–A1 is not read from memory 23 until the scanner LSA scans all of its lines for the fourth time. At each time *t*10 bit 10 of the current control word (which is now in this example the control word for line L–A1) is read from the memory 23 and is routed around the logic 26 to be entered at time *t*20 into bit position 2 of the same control word. The new bit originally destined for the line L–A1 control word bit position 2 is now, after four scans, in its proper position, and will subsequently be transmitted on line L–A1.

DETAILED DESCRIPTION

Figure 1:
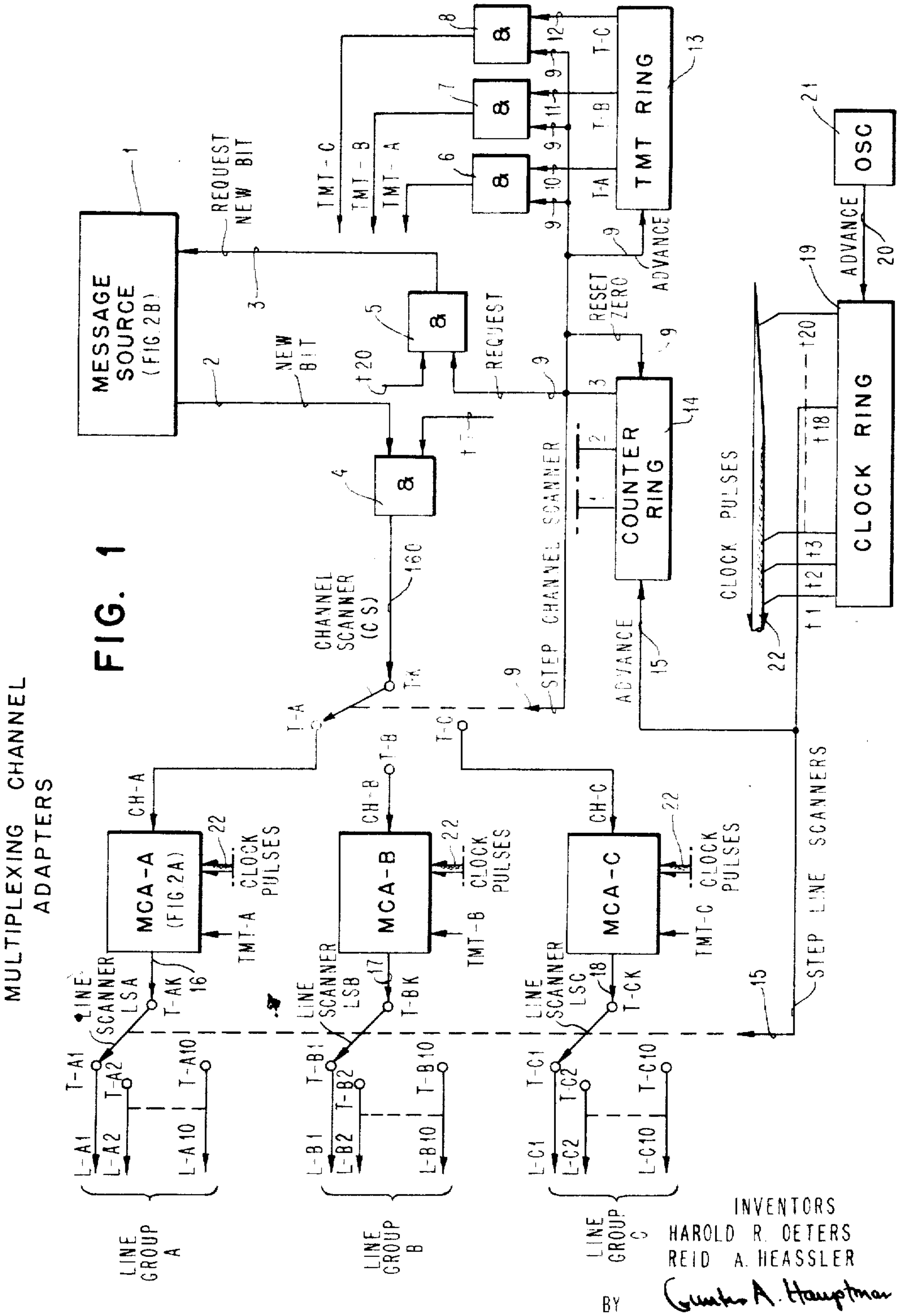

*The system.*—Referring to FIGURE 1, the system is under the control of clock pulses generated by a clock ring 19 which is operated by stepping signals placed on line 20 by oscillator 21. The clock ring 19 applies an output on a different one of 20 timing output lines *t*1 through *t*20 after each signal on line 20 from the oscillator 21, the stepping sequence being repeated from *t*1 after every 20 signals from the oscillator 21. The construction of the clock ring 19 and the oscillator 21 are well-known and will not be described here. The clock signals from the clock ring are transferred to other circuitry in FIGURE 1 via a cable 22.

The system of FIGURE 1 is connected to 30 terminal units (not shown) via three groups A, B and C of ten lines each. Each of the group of lines A, B and C is associated with a line scanner LS and with a multiplexing channel adapter MCA as shown. For example, ten lines L–A1 through L–A10 are connected to line scanner LSA terminals T–A1 through T–A10, a common terminal T–AK of the line scanner LSA being connected via line 16 to multiplexing channel adapter MCA–A. Similarly, ten lines L–B1 through L–B10 are connected via line scanner LSB and line 17 to the multiplexing channel adapter MCA–B and ten lines L–C1 through L–C10 are connected via line scanner LSC and line 18 to the multiplexing channel adapter MCA–C. Each one of the multiplexing channel adapters is operated in accordance with clock pulses received on table 22 from the clock ring 19 as will be explained later with reference to FIGURE 2*a*. At any one time, one, and only one, of the multiplexing channel adapters is operative to transmit a bit to one, and only one, of its associated lines. A multiplexing channel adapter is selected for this purpose by the application of a signal to its transmit input TMT, the appearance of a transmit signal on one of the transmit lines TMT–A, TMT–B or TMT–C causing the corresponding one of the multiplexing channel adapters MCA–A, MCA–B or MCA–C to place a signal onto the line to which its related line scanner is connected at that time. A channel scanner CS is connected to each of the multiplexing channel adapters MCA–A, MCA–B and MCA–C via channels CH–A, CH–B and CH–C to scanner terminals T–A, T–B and T–C respectively. For example, when the channel scanner CS contacts terminal T–A, an input 160 to the channel scanner is connected to channel CH–A. As will be presently described, the position of the channel scanner CS coincides with the selection (by a TMT–A, TMT–B or TMT–C signal) one of the multiplexing channel adapters MCA–A, MCA–B or MCA–C.

Stepping of the line scanners LSA, LSB and LSC and the channel scanner CS are synchronized. The line scanners LSA, LSB and LSC always step together to select the same line in each group; whereas, the channel scanner CS is stepped once for every three steps of the line scanners. For example, the order of selection may be indicated as: (CH–A, L–A1, L–B1, L–C1); (CH–A, L–A2, L–B2, L–C2); (CH–A, L–A3, L–B3, L–L3); (CH–B, L–A4, L–B4, L–C4); etc., the underlining indicating the selection of new channels by the channel scanner CS. A clock pulse *t*18 is applied to line 15 simultaneously stepping the three line scanners, LSA, LSB and LSC. A counter ring 14 (similar to the clock ring 19 in design) is stepped via line 15 once for every clock pulse *t*18; which causes the channel scanner CS to be stepped once, via line 9, for every third clock signal *t*18. The counter ring 14 is reset to one by the *t*18 pulse following the *t*18 pulse which set it to three. A three position TMT ring 13 (similar in design to both the clock ring 19 and counter ring 14) is advanced by a signal on line 9 from the counter ring 14 every time that the channel scanner CS is stepped. Thus a signal appears at one of the outputs 10, 11 or 12 at a time to indicate the corresponding position T–A, T–B or T–C of the channel scanner CS. AND circuit 6, 7 and 8 (of standard design) inputs are each connected to one of the TMT ring 13 outputs 10, 11 and 12 and are all connected to the line 9. One of the AND circuits 6, 7 and 8 will therefore have an output on one of the lines TMT–A, TMT–B or TMT–C during every line scan that the channel scanner CS is stepped; that is, during every third occurrence of time *t*18. As a result, the multiplexing channel adapter connected to the currently selected channel scanner terminal will be enabled for the interval that its line scanner is connected to one line. For example, if at a time *t*18 the channel scanner CS is stepped from terminal T–C to T–A at the same time that the line scanners LSA, LSB and LSC are stepped from their respective lines L–4 to L–5, multiplexing channel adapter MCA–A will be enabled during the interval that its line scanner LSA contacts line L–A5.

Figures 4A, 4B:
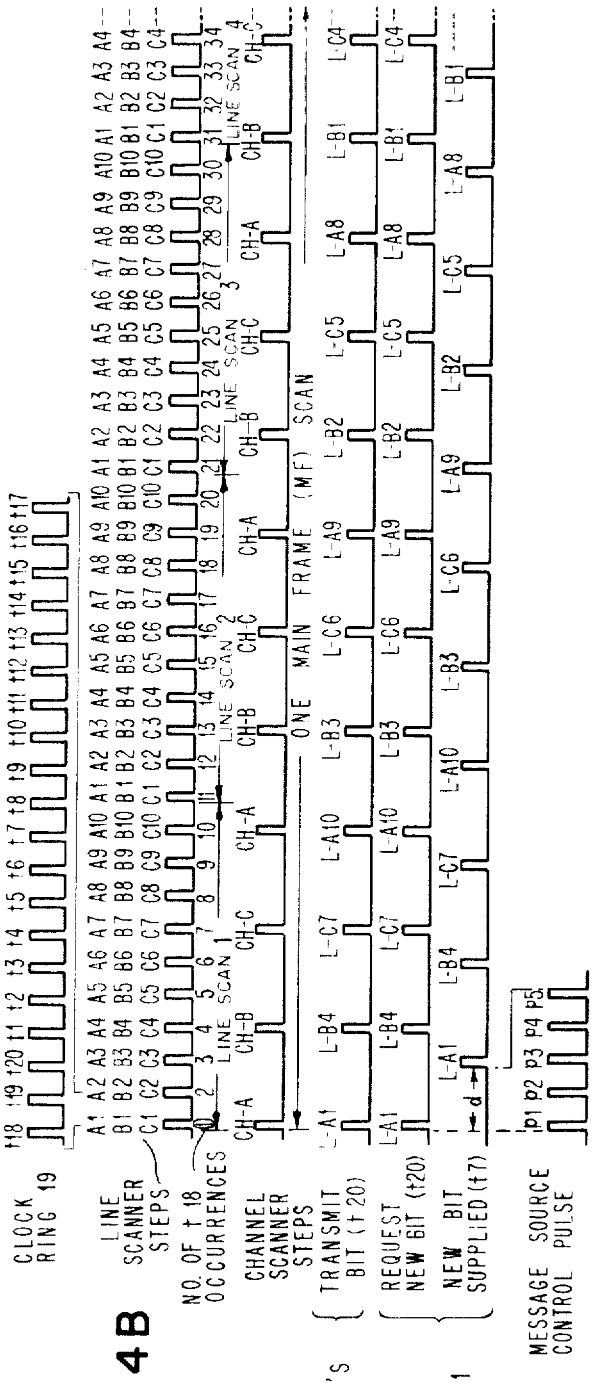

The stepping relationship of the line scanners LSA, LSB and LSC and the channel scanner CS are shown in the table of FIGURE 4*a*. The vertical columns illustrate, for successive clock pulses *t*18 (of which 90 are shown), the current line selection positions (for example: A1, B1, C1) of the line scanners LSA, LSB, LSC and also the channel selections made by the channel scanner CS. The lines scanned by the three line scanners LSA, LSB and LSC during any one scan, are shown in the first horizontal set of rows. The channel scanner CS channel selections made during nine successive complete scans of the line scanners are shown in the balance of the table. For example, during the first complete scan by the line scanners LSA, LSB and LSC (which occurs during ten successive clock pulses *t*18 each indicated by a numeral) the three line scanners connect to each one of their respective ten lines in turn. Thus during the first occurrence of clock pulse *t*18, the line scanner LSA is connected to terminal T–A1 going to line L–A1, the line scanner LSB making contact with terminal T–B1 connected to line L–B1 and line scanner LSC making contact with terminal T–C1 connected to line L–C1 at the same time. Also during the first occurrence of clock pulse *t*18, the channel scanner CS is connected through terminal T–A to channel CH–A of multiplexing channel adapter MCA (and consequently the TMT ring 13 is set to place a signal on line 10). Therefore, when the multiplexing channel adapter MCA–A is selected, by means of a TMT–A signal, multiplexing channel adapter MCA–A is connected to line L–A1, which line is designated as "serviced" (i.e. a bit is transmitted on it). When the second clock pulse *t*18 occurs, the line scanners LSA, LSB and LSC will be stepped to connect to the next lines L–A2, L–B2 and L–C2 in their groups as shown in FIGURE 4*a*, and the counter ring 14 will be advanced one position to indicate the count of one. Since the counter ring 14 is not in a position to place a signal on line 9, the channel scanner CS remains connected to channel CH–A and no signals are applied on the transmit lines to enable the multiplexing channel adapters. Therefore no line is serviced. When the third clock pulse *t*18 occurs, the line scanners LSA, LSB and LSC advance to line L–A3, L–B3 and L–C3, as shown in FIGURE 4*a*, and the channel scanner CS remaining set to channel CH–A (the counter ring 14 advancing to the count of two). Again no line is serviced. During the fourth clock pulse *t*18, the line scanners LSA, LSB and LSC again advance (to lines L–A4, L–B4 and L–C4) and (since the counter ring 14 now advances to the number three placing a signal on line 9) the channel scanner CS is moved to terminal T–B. Further, the signal on line 9 steps the TMT ring 13 to place a signal on line 11, the resulting output from AND circuit 7 selecting multiplexing channel adapter MCA–B, causing line L–B4 to be serviced. The same operation is continued until, after the tenth occurrence of the clock pulse *t*18, the line scanners LSA, LSB and LSC repeat their operation starting from the lines L–A1, L–B1 and L–C1 in sequence again. The successive stepping of the channel scanner CS once for every three steps of the line scanners LSA, LSB and LSC is continued, until after nine complete scans by the line scanners, every line will have been serviced (i.e. given an opportunity to transmit a bit).

Every time that a line is serviced by transmission of a bit from its associated multiplexing channel adapter, a new (replacement) bit must be obtained, since each bit is part of a complete character to be transmitted on the line, several characters forming a word and many words forming a message. When a bit has been transmitted (at time *t*20 as will be explained with reference to FIGURE 2*a*) a request for a new bit for that line is made via request new bit line 3 by operation of AND circuit, or "gate," 5 at time *t*20. The gate 5 is operated only when a bit has been transmitted (i.e. a line has been serviced) which occurs, as previously explained, when the counter ring 14 is in position three. Message source 1 (explained more fully with reference to FIGURE 2*b* below), supplies requested information (a new bit in this example) via new bit line 2 to an AND circuit 4, which circuit is operated by the clock ring 19 at a subsequent time *t*7 after the clock ring 19 has cycled past the time of request *t*20 several times.

Figure 2A:
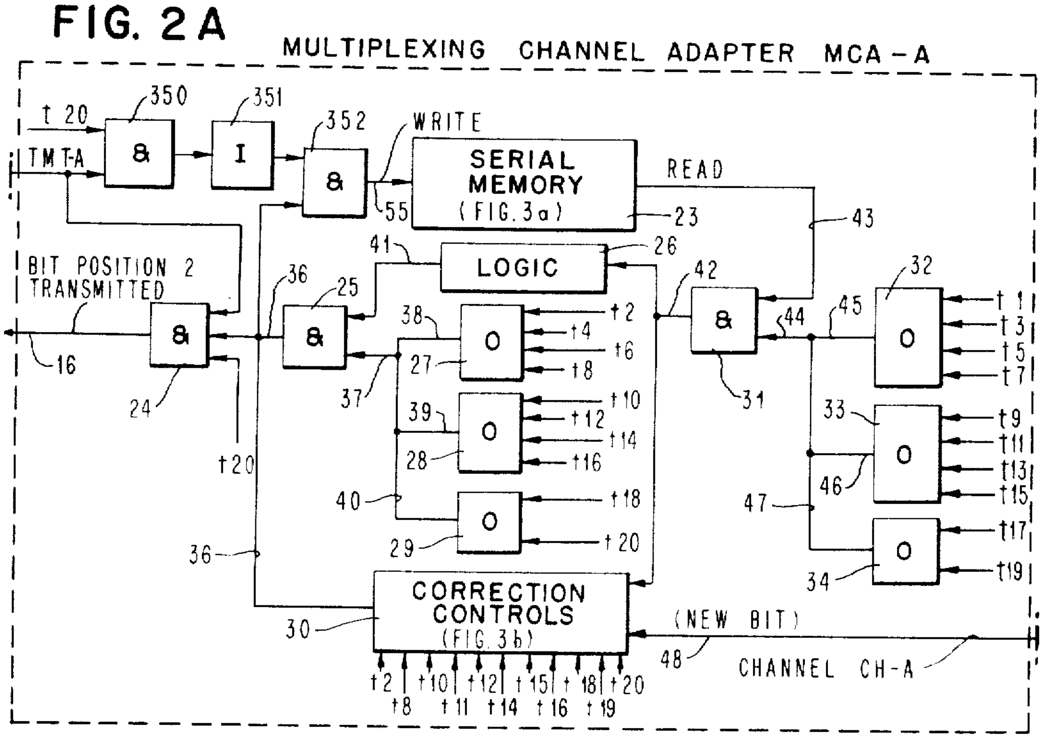
Figure 2B:
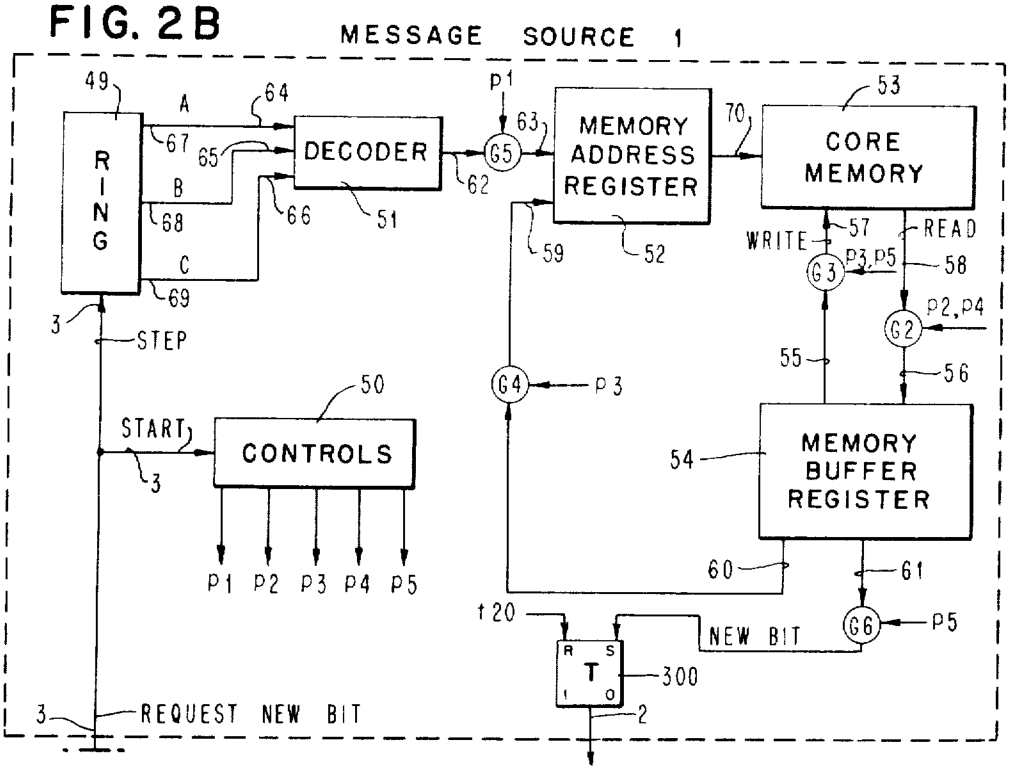

*The message source*.—Referring to FIGURE 2*b*, the message source 1 is shown in more detail. A request for a new bit is received (at time *t*20) at input 3 and corresponding new bits are applied (when available) to line 2. The operation and structure of the message source 1 is similar to the apparatus described in the referenced R. M. Tomasulo et al. application. When a request for a new bit is received on line 3, controls 50 are started to cause generation of five sub-timing signals *p*1 through *p*5 which control operation of the message source 1. A core memory 53 stores, in locations, bits forming characters of a message for each one of the 30 lines shown in FIGURE 1. A memory address register 52, which is connected to the core memory 53 via line 70, selects one location in the core memory 53 in accordance with address information stored in the register. The contents of the selected location in the core memory 53 are read via line 58 and gate G2 into a memory buffer register 54 at sub-times *p*2 and *p*4. The contents of the memory buffer register 54 are then rewritten into the core memory 53 via lines 55 and 57 and gate G3 at sub-times *p*3 and *p*5 to regenerate the information removed from memory. Information from the core memory 53 may be either data, to be sent as a new bit onto line 2, or it may be another address. As is explained in the aforesaid reference R. M. Tomasulo et al. application, the first address placed into the memory address register 52 is the address of a "main frame control word" (as distinguished from multiplexing channel adapter "control words" to be discussed below), which word itself contains the address of a data word, which data word contains the next (new) bit to be placed on a new bit line 2. Therefore the first application of the contents of the memory address register 52 to the core memory brings a main frame control word into the memory buffer register 54 at sub-time *p*2. The address portion of the main frame control word is then transferred at sub-time *p*3 to the memory address register 52 via gate G4 to bring a data word from the core memory 53 into the memory buffer register 54 at sub-time *p*4. One selected bit of the data word is then transmitted via gate G6 at time *p*5 into a trigger 300 which will hold the bit for sending on new bit line 2 when required.

Specification of main frame control word locations in the core memory 53 are synchronized with the operation of the line scanners LSA, LSB and LSC and the channel scanner CS so that the proper main frame control word corresponding to the currently serviced line is brought out into the buffer register 54. A ring 49 and a decoder 51 together perform the synchronization function in such a manner that when a request for a new bit appears on line 3 the control word for the currently serviced line (the one that has just transmitted a bit) will be addressed by the memory address register 52. Each time that a request for a new bit appears on the line 3 the ring 49 is stepped so that at all times one of the output lines 67, 68 and 69 of the ring 49 will have a signal applied to it corresponding to the current position of the channel scanner CS. Since a request for a new bit appears on the line 3 every time that the channel scanner CS is stepped, the outputs 67, 68 or 69 of the ring 49 will always indicate the position of the channel scanner CS. The outputs 67, 68 and 69 of the ring 49 are applied to the decoder 51 which generates, an output line 62, a single address of a control word corresponding to the currently serviced line (which is in the group connected to the multiplexing channel adapter specified by the channel scanner). The decoder 51 operates in accordance with the table of FIGURE 4*a*, generating addresses of control words corresponding to lines L–A1, L–B4, L–C7, L–A10, L–B3, L–C6, etc, in sequence.

In summary, at sub-time $p1$ the gate G5 is activated to place the main frame control word address (corresponding to the currently serviced line) on input line 63 to the memory address register 62. The address is then applied via line 70 to the core memory 53 to cause the corresponding main frame control word to appear on read line 58. At sub-time $p2$, the gate G2 is activated to place the main frame control word into memory buffer register 54 via line 56. At sub-time $p3$, the main frame control word is rewritten via gate G3 into the core memory 53 and the address portion of the main frame control word is transferred via line 60 and gate G4 to the input 59 of the memory address register 52. This address is then applied to input 70 of the core memory 53 to bring out the data word corresponding to the previously serviced line. At sub-time $p4$ this data word is transferred via G2 into the memory buffer register 54. At sub-time $p5$ the gate G6 is operated to store the new bit in trigger 300, making the new bit available on line 2.

Figure 3A:
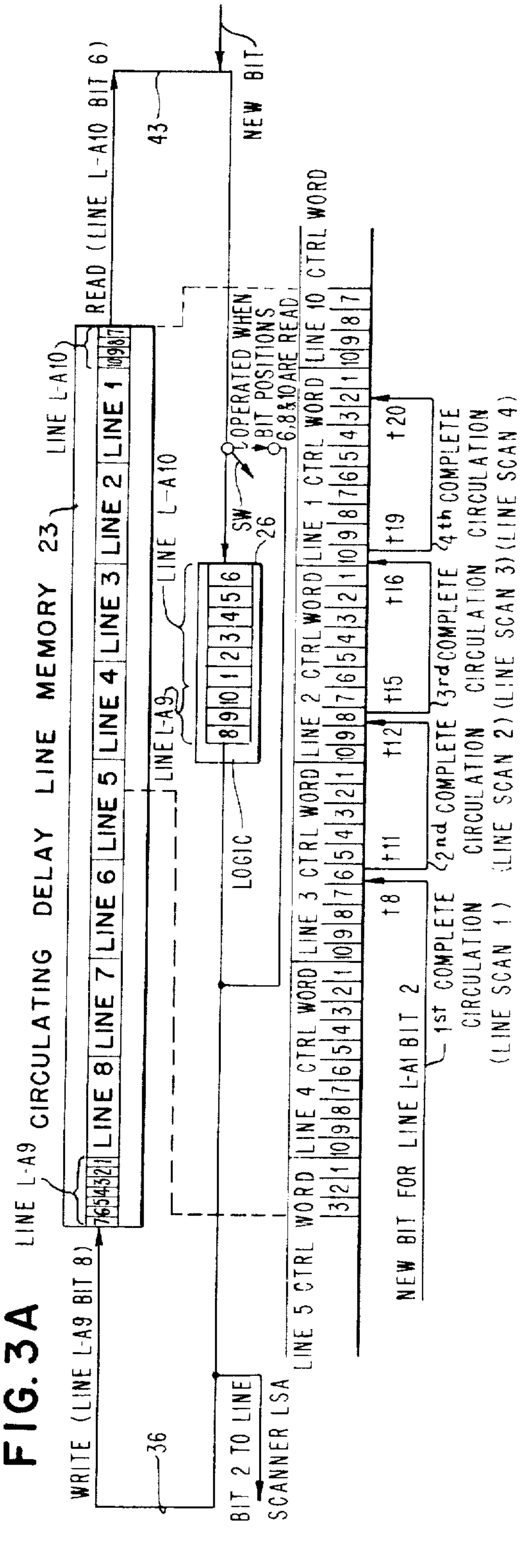

It will be noted that there has been a substantial delay $d(d=p5-p1)$ between the time $t20$ that a request for a new bit appears on line 3 and the time (the clock pulse $t7$ following several cycles of clock ring 19) that the new bit appears on line 2. The delay $d$ is so long that the line scanners LSA, LSB and LSC (but not the channel scanner CS) have stepped to other positions. Therefore the new bit supplied from the message source 2 is supplied at a time that the multiplexing channel adapters (MCA–A, MCA–B and MCA–C) are no longer connected to the line for which the bit is destined. For example, if at $t18$ channel scanner CS selects multiplexing channel adapter MCA and line scanner LSA scans line L–A1, a bit will at time $t20$ be transmitted on line L–A1. At this time $t20$ a request for a new bit is made, which bit will be supplied at a time $t7$ following the stepping of the line scanner LSA to line L–A3. At this time the channel scanner CS is still connected to multiplexing channel adapter MCA, however there is no transmission from this unit at this time because counter ring 14 is not in position three. As will be explained below with reference to FIGURE 2$a$ and FIGURE 3$a$, "control words" are supplied in the multiplexing channel adapters MCA–A, and MCA–C in association with currently scanned (whether "serviced" or not lines). Only the one control word associated for the currently scanned line is available in each multiplexing channel adapter. Therefore, the new bit is intended for line L–A1 (and requested when line L–A1 was scanned) is supplied at a time that the multiplexing channel adapter MCA–A scans line L–A3, the new bit being "erroneously" associated with the control word for line L–A3, instead of the control word for line L–A1. However, since line L–A1 is not again utilized for transmission until every other line has been serviced (though it is more frequently scanned), there is sufficient time to make a correction.

*The multiplexing channel adapters.*—Referring to FIGURE 2$a$, multiplexing channel adapter MCA–A (representative also of MCA–B and MCA–C) is shown in more detail. The multiplexing channel adapter MCA–A is similar in construction to that described in the Kersey et al. application previously referenced, a serial memory 23 disclosed herein being shown as a serially-utilized random access memory in the Kersey et al. application. As explained in that patent application each line to which the multiplexing channel adapter is connected is provided with a control word in a memory, shown in FIGURE 2$a$ as the serial memory 23 (which is shown functionally in FIGURE 3$a$). Referring to FIGURE 3$a$, each one of the ten lines in group A is allotted ten bit positions, designated a "control word," in the memory 23, there being room in the memory 23 for nine of the ten control words (plus one bit of the tenth control word) necessary to service ten lines. A miscellaneous set of logic circuits 26, shown in both FIGURE 3$a$ and FIGURE 2$a$, is sufficient to hold nine bits of the tenth control word. Thus all the bits of the ten control words are (dynamically) "stored" in the loop formed by the memory 23, the logic 26 and the interconnecting lines 43 and 36. The particular position of the control words changes continuously in synchronization with the scanning of the lines L–A1 through L–A10 by the line scanner LSA. For example, as the line scanner LSA steps to terminal T–A1 of line L–A1 at time $t18$ the first bit of the control word for line 1 is simultaneously written into the memory 23. (If reference is made to FIGURES 4$c$ and 4$d$, it will be seen that a new line scan begins, and the first bit is written, at each time $t18$.) Since the logic 26 has room fore nine bits, the ninth bit of the same control word will have been read from the memory 23 during the previous time $t17$ of the same "memory cycle." As has been explained previously in the general description, reading from the memory 23 and the writing into the memory 23 occur during successive parts, odd-numbered and even-numbered times respectively, of the same memory cycle.

Referring again to FIGURE 2$a$, bits from the serial memory 23 are read into the logic 26 during odd-numbered times of the clock ring 19 and are written into the serial memory 23 during even-numbered times of the clock ring 19 under control of standard AND and OR circuits. The successive outputs of the serial memory 23 on the read line 43 are applied to the AND circuit 31 and gated onto a line 42 connected to the logic 26 whenever there is an input 44. Signals appear on line 44 to AND circuit 31 from outputs 45, 46 and 47 of the OR circuits 32, 33 and 34. The inputs to these three OR circuits are all of the odd-numbered timing signals $t1$, $t3$, $t5$, etc. from the clock ring 19. The logic 26 output 41 is normally connected to the write input 35 (through a normally enabled AND circuit 352) of the serial memory 23 via AND circuit 25, which is enabled whenever a signal appears at its input 37 connected to outputs 38, 39 and 40 of the OR circuits 27, 28 and 29. These three OR circuits are operated by the even-numbered outputs $t2$, $t4$, $t6$, etc. of the clock ring 19. The second bit position in every control word is the bit sent onto line 16 of line scanner LSA when the corresponding line of the group A is serviced. The AND circuit 24 performs the "servicing" function, transmitting the bit when the multiplexing channel adapter MCA–A is selected by means of a transmit signal on the TMT–A line, at time $t20$ (which corresponds to the time that bit position 2 is written). When the contents of bit position 2 of the control word are sent, the bit position is "reset" by blocking it from being written into the memory 23 through AND circuit 352. This is accomplished by an inhibit signal from an inverter 351 connected to an AND circuit 350, which signal disables the AND circuit 352 when a signal on the TMT–A line coincides with a $t20$ signal.

The read output 43 of a serial memory 23 is also connected via the AND circuit 31 to correction controls 30. The correction controls 30 receive, in addition to control words from the serial memory 23, new bits on line 48 from the message source 1. New bits available from the message source 1 at time $t7$ are applied via the channel scanner CS to the multiplexing channel adapted MCA–A on line 48 if the channel scanner CS is set to terminal T–A. As previously explained, a new bit for a line will arrive after the control word for that line is no longer available. Generally stated, a new bit intended for control word N bit position 2 arrives at the time $t7$ which precedes the writing into memory 23 of bit 6 of control word $N+2$. For example, a new bit intended for bit position 2 of the control word for line L–A1 will arrive at a time when bit 6 of the control word for line L–A3 is being written. The correction controls 30 permit new bits to be written into "wrong" positions since during successive repeated readings of the control words the new bit will be moved from control word to control word until it appears in the "correct" bit position of the "correct" control word. Bit positions 6, 8 and 10 of every control word are left free for this purpose. When one of these bit positions is detected by the correction controls 30 its contents are immediately rewritten into the memory 23 (eight bit positions earlier) without passing through the logic 26, the logic suppressing the original contents of this bit position when a replacement is to be made. Thus, for example, during the same scan, the contents (a new bit destined for control word N) of bit position 6 of each control word $N+2$ are written into bit position 8 of the previous control word $N+1$, the contents (another new bit, this one destined for control word $N+1$) of bit position 8 of each control word $N+2$ are written into bit position 10 of the previous control word $N+1$, and the contents (still another new bit, belonging in bit position 2 of the control word $N+2$) of bit position 10 of each control word $N+2$ are written into the bit position 2 of the same control words. The contents of bit position 2 are not moved further since this is the "correct" bit position from which the next bit to be sent on the associated line will be taken.

Figure 3B:
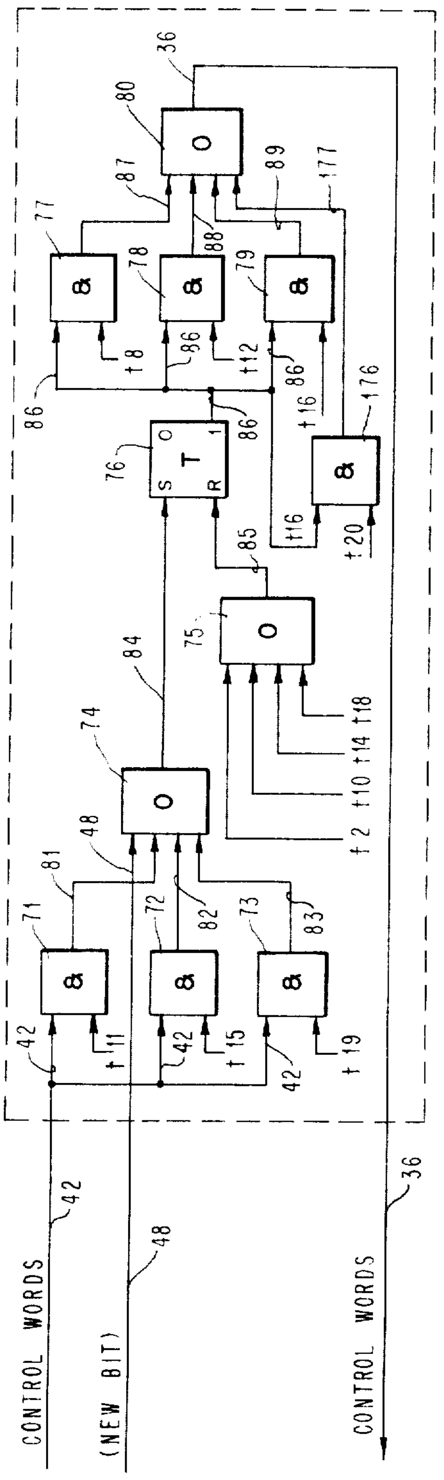
Figure 4C:
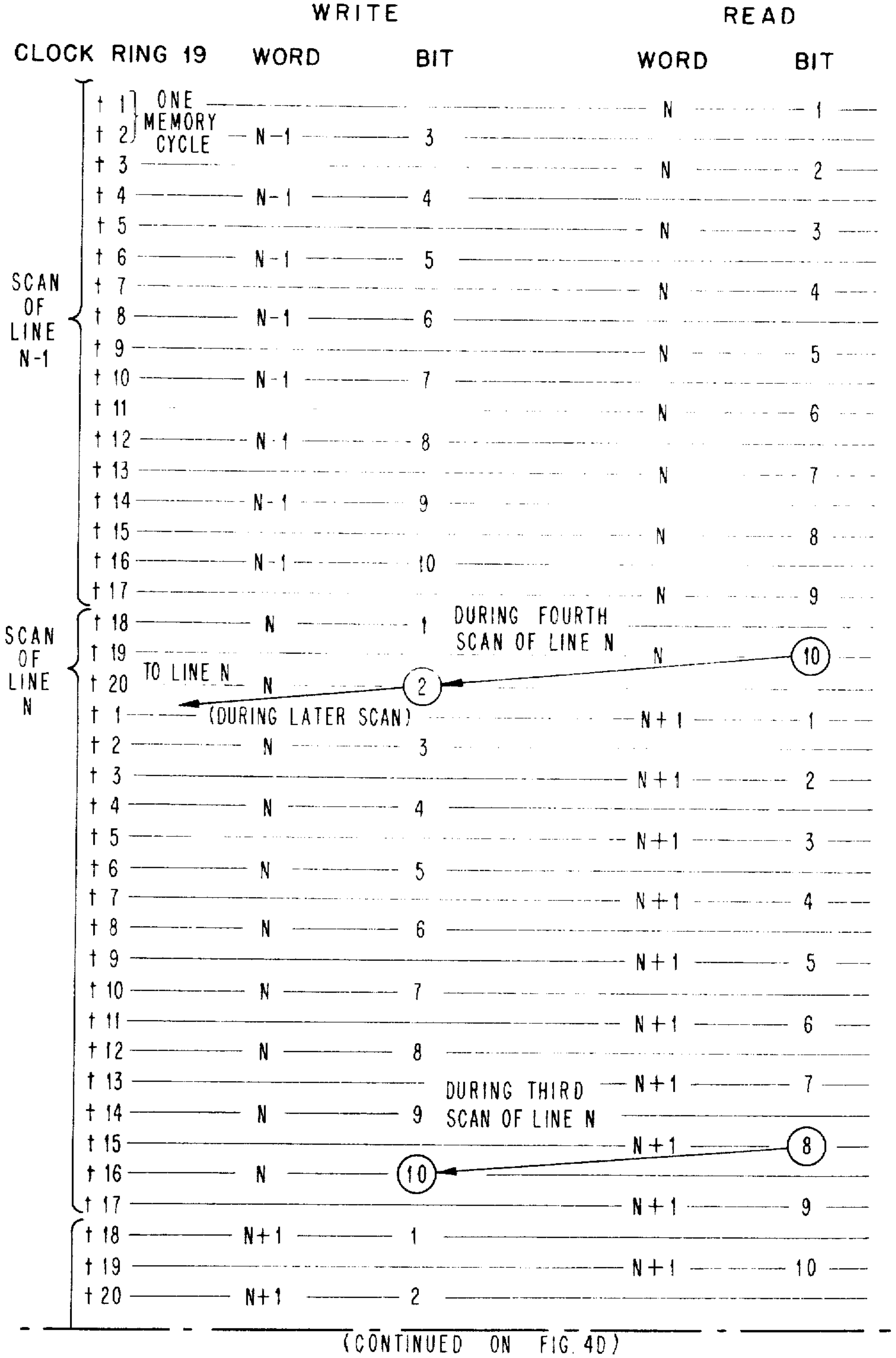
Figure 4D:
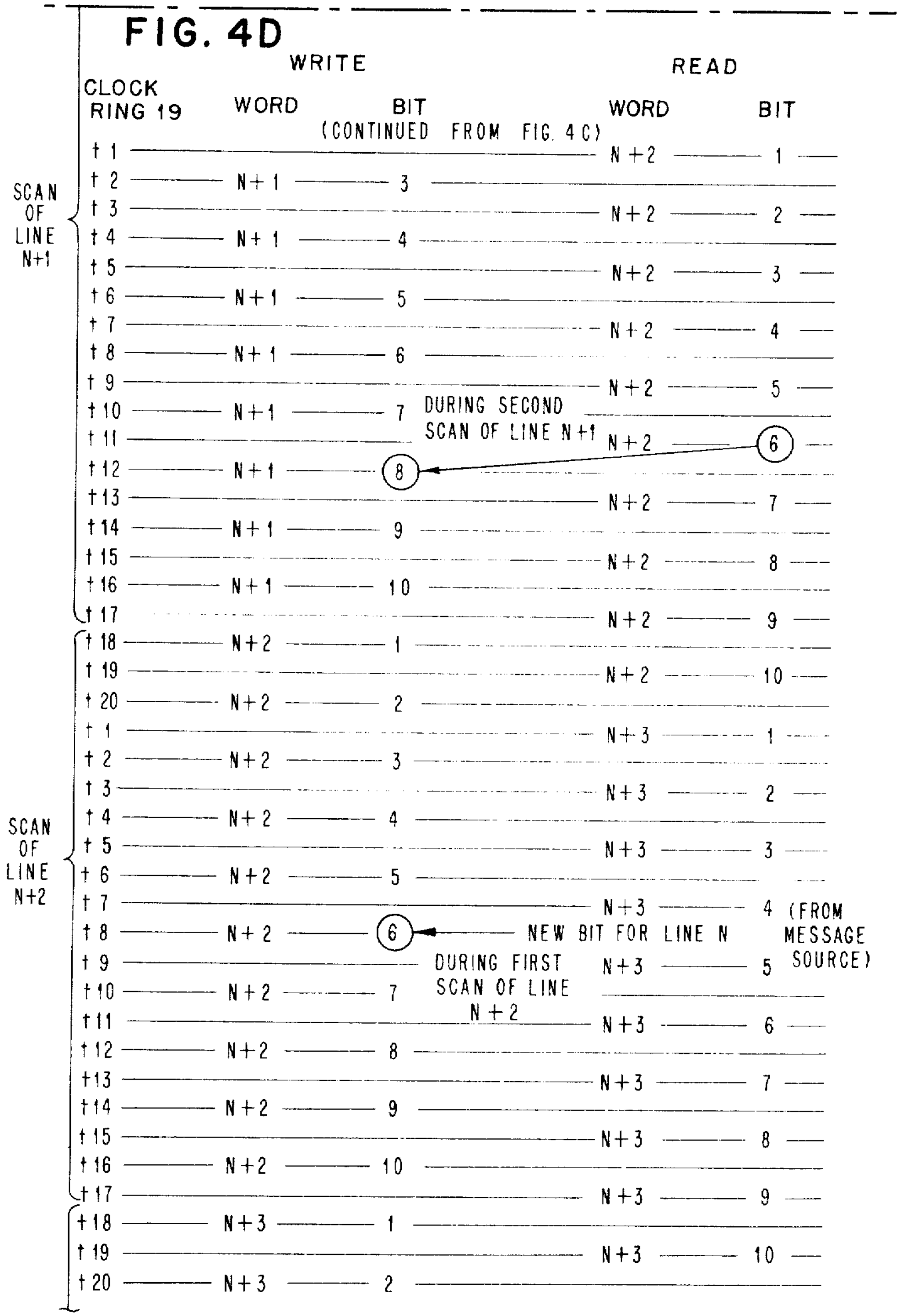

*The correction controls.*—Referring to FIGURE 3*b*, the correction controls 30 are shown in more detail. The bits of control words from the circulating delay line memory 23 are applied via line 42, new bits, to be entered into bit position 2 of control words, appear on line 48 and control words to be written into the serial memory 23 are placed onto line 36. Only specified bit positions (6, 8 and 10) are utilized for correction purposes it being therefore necessary for only these three bit positions, and bit position 2, of control words to be operated upon by the correction controls 30. The successive bits of control words entered on line 42 are applied to AND circuits 71, 72 and 73 which pass them to respective ones of OR circuit 74 inputs 81, 82 and 83 at corresponding times *t*11, *t*15 and *t*19. New bits are supplied to OR circuit 74 via line 48 at time *t*7 from AND circuit 4 in FIGURE 1. As shown in FIGURES 4*c* and 4*d*, time *t*11 corresponds to the reading of bit position 6, time *t*15 corresponds to the reading of bit position 8 and time *t*19 corresponds to the reading of bit position 10 of every control word. Therefore, the contents of these three bit positions in every control word (plus new bits) are passed to the inputs of OR circuit 74, which applies them to line 84. Each signal present at output 84 of OR circuit 74 is applied to the set inputs of a standard trigger 76 causing the trigger to be set to the "1" state and causing an output to appear on line 86, if the single represents a 1-bit. The trigger 76 is reset to the "0" state previous to the application of bits from the OR circuit 74 by means of the OR circuit 75 which is operated at times *t*2, *t*10, *t*14 and *t*18 to place a signal at the reset input R of the trigger via line 85. The contents of the trigger 76 are applied to four AND circuits 77, 78, 79 and 176 via line 86, which AND circuits are operated at times *t*8, *t*12, *t*16 and *t*20 to transfer the contents of the trigger 76 to the OR circuit 80 via a corresponding one of the lines 87, 88, 89 and 177. The output 36 of the OR circuit 80 is connected to the write input of the memory 23.

It should be noted that the trigger 76 stores a bit for only one clock time of a memory cycle. If a memory cycle were defined as being of one time pulse length (i.e. reading and writing are simultaneously performed) the trigger 76 would not be required.

The timing signals from the clock ring 19 are applied to the AND circuits 4, 71, 72, 73, 77, 78, 79 and 176 in such a manner that new bits are entered into control words in bit position 6, the contents of bit position 6 are entered into bit position 8 of an adjacent control word, the contents of bit position 8 are entered into bit position 10 of an adjacent control word and the contents of bit position 10 are entered into bit position 2 of the same control word. For example, the trigger 6 is initially at time *t*2 reset to the "0" state. At time *t*7 a new bit for the control word of line L–A1 bit position 2 appears on line 48 causing the trigger 76 to be set to the "1" state. At time *t*8 this bit is transferred via AND circuit 77 into the memory 23 into control word 3 at the time (and in place) of bit position 6 of the control word for line L–A3. The next time that bit position 6 of the control word for line L–A3 is examined, which occurs at time *t*11 of the next complete scan cycle, the contents of bit position 6 are entered via AND circuit 71 into the trigger 76 and are at time *t*12 re-entered into the circulating delay line memory 23 via AND circuit 78 in bit position 8 of the previous control word L–A2. The next time that bit position 8 of the control word for line L–A2 is examined, which occurs at time *t*15 during the next complete scan, the contents of this bit position 8 are stored via AND circuit 72 in the trigger 76 from where they are removed via AND circuit 79 at time *t*16 and re-entered into the memory 23 at bit position 10 of the next preceding control word (for line L–A1). When bit position 10 of the control word for line L–A1 is again examined (during the next scan at time *t*19), its contents are transferred to trigger 76 via AND circuit 73 for subsequent transfer at time *t*20 to bit position 2 of the same control word via AND circuit 176. It is evident from the above description that bit transfers can, and often do occur as a result of several new bits during the same scan; though only the transfers associated with one new bit have been described.

DETAILED DESCRIPTION OF OPERATION

The operation of the apparatus embodying the invention will be explained with reference to the pulse diagram of FIGURE 4*b* and the table of FIGURES 4*c* and 4*d*. For simplicity only line L–A1 will be discussed in detail and it will be assumed that associated multiplexing channel adapters MCA–A already holds a bit to be sent at the next appropriate time. The letter N in FIGURE 4*c* will, in this example, equal one.

FIGURE 4*b* illustrates the pulses present in FIGURES 1, 2*a*, 2*b*, 3*a* and 3*b*. The stepping of the clock ring 19 in FIGURE 1 is shown, for the first scan of the line scanners LSA, LSB and LSC, at the top of FIGURE 4*b*. The clock ring 19 generates 20 pulses in sequence for each single step of the line scanners, the line scanners being advanced simultaneously one position at each time *t*18 (which corresponds to the writing of bit position 1 of a control word) of the clock ring 19, each complete sequential stepping of the scanners through their ten positions being called a "line scan." The channel scanner CS is stepped once (to "service" one line) for every three steps of the line scanners LSA, LSB and LSC by means of the counter ring 14 which is advanced one position by each clock ring 19 output *t*18. After every third time *t*18 that the channel scanner CS is stepped to a new position a transmission of a bit occurs (at time *t*20) from bit position 2 of a control word held in the circulating memory 23 of a multiplexing channel adapter currently selected by the channel scanner CS. At the same time a new bit, to replace the one transmitted, is requested from the message source 1, the message source 1 supplying the requested new bit after a delay *d*, as shown in FIGURE 4*b*. The process that the message source 1 goes through to supply the requested new bit is controlled by message source sub-time pulses *p*1 through *p*5 shown in FIGURE 4*b*.

*Occurrence 1 of t18* (*Line Scan No. 1*).—During the first line scan, when the clock pulse *t*18 appears for the first time from the clock ring 19 as a result of an advance signal on line 20 from the oscillator 21, a step line scanners signal is applied to line 15 to step the three line scanners LSA, LSB and LSC (initially at terminals T–A10, T–B10 and T–C10) to select the lines L–A1, L–B1 and L–C1 respectively. The signal on line 15 is also applied to the advance input of the counter ring 14 (initially at its second position) to step it to its third position, which applies a signal at output 9 to step the channel scanner CS (initially at terminal T–C) to channel CH–A. The signal on line 9 is also applied to AND circuits 5, 6, 7 and 8 and to the transmit ring 13. The transmit ring 13 (initially at position T–C) is stepped to position T–A which applies a signal to line 10 and causes an output from AND circuit 6 on the line TMT–A to the multiplexing channel adapted MCA–A. Referring to FIGURE 2*a,* the logic 26 is at this time emitting, at output 41, the contents of bit position 1 of the control word for line L–A1. At time *t*18 the AND circuit 25 input 37 is activated by line 40 from OR circuit 29 to pass bit 1 of the control word for line L–A1 into the serial memory 23 via AND circuit 352 which is normally enabled.

Still during the first line scan, at time *t*19, the AND circuit 31 is activated by a signal at input 44 to pass bit 10 of the control word for line L–A1 into the logic 26 from the memory 23.

Still during the first line scan, at time *t*20, the second bit of the control word for line L–A1 is emitted from the logic 26 via the line 41. The AND circuit 25 is activated by an output from OR circuit 29 to pass the contents of bit position 2 to the line 36. This bit position contains the signal which is to be transmitted on the line L–A1. The contents of bit position 2 are applied to the AND circuit 24, which, as a result of signals on TMT–A line 10 and line *t*20, cause the first bit of a character to be applied to line L–A1 via line scanner LSA. The contents of bit position 2, just transmitted, are not written into the memory, being blocked by an inhibit signal from inverter 351 as a result of the application of TMT–A and *t*20 signals to AND circuit 350. As a result this bit position is "empty" (i.e. contains a 0-bit). At this time, referring to FIGURE 1, a new bit (the next bit of the character) is requested from the message source 1 via AND circuit 5 and the new bit line 3. Referring to FIGURE 2*b,* the request for a new bit for line L–A1 causes operation of the message source 1 (during subsequent clock pulses) as previously described with reference to FIGURE 2*b.* The new bit intended to replace the one that was transmitted from the control word for line L–A1 will appear at the output 2 of the message source 1 at a later time after a delay *d.*

Still during the first line scan, at times *t*1 through *t*17 bits 3 through 10 of the control word for line L–A1 are written into the serial memory via the AND circuit 25 and bits 1 through 9 of the next control word (for line L–A2) are entered into the logic 26 via AND circuit 31.

*Occurrence 2 of t18 (Line Scan No. 1).*—Still during line scan 1, the second occurrence of time *t*18 as a result of the re-cycling of the clock ring 19 causes the line 15 to step the line scanners LSA, LSB and LSC to select lines L–A2, L–B2 and L–C2 respectively. The counter ring 14 is stepped to its first position which, since no signal is placed on line 9 at this time, causes the channel scanner CS to remain set to channel CH–A. Further, the absence of a signal on line 9 causes the AND circuits 6, 7 and 8 to be disabled preventing the AND circuit 24 in FIGURE 2*a* from transferring a bit to line L–A2. Since no bit is transmitted, it will not be necessary to request (at time *t*20) a new bit from the message source, the absence of a signal on line 9 disabling the AND circuit 5 so that such a request is not made. During the ten times *t*18 through *t*17 the bits of the control word associated with the second line L–A2 in the multiplexing channel adapter MCA–A are handled as previously described for line L–A1.

*Occurrence 3 of t18 (Line Scan No. 1).*—Still during the first line scan, the third appearance of the clock signal *t*18 causes the line scanners LSA, LSB and LSC to be stepped to the lines L–A3, L–B3 and L–C3. The counter ring 14 is stepped to its second position so that no output appears on line 9, causing the channel scanner CS to remain set to terminal T–A, preventing the application of TMT signals (and thus preventing transmission of a bit on line L–A3) and also preventing a request for a new bit from being made at time *t*20. The handling of control words within the multiplexing channel adapter during times *t*18 through *t*6 is the same as has been described. At time *t*7, however, the new bit previously requested for bit position 2 of the control word for line L–A1 is passed by the AND circuit 4 of FIGURE 1 and is applied on line 48 directly into OR circuit 74 of FIGURE 3*b,* setting the trigger 76 to the state indicated by the new bit (which is the "1" state, assuming the new bit to be a 1-bit). At time *t*8 the contents of the trigger 76 are transferred to bit position 6, via AND circuit 77, of the current control word for line L–A3. The handling of control words continues during times *t*9 through *t*17 as previously described.

*Occurrences 4–10 of t18 (Line Scan No. 1).*—Still during the first line scan, subsequent appearances of the clock signal *t*18 cause a repetition of operations similar to those just described for the first three occurrences of clock signals *t*18. After the fourth, seventh and tenth appearances, the channel scanner CS will be stepped to terminals T–B, T–C and T–A respectively, a bit will be sent onto lines L–B4, L–C7 and L–A10 respectively and new bits for these lines will be requested. After the sixth and ninth appearances of signal *t*18, at time *t*7, the new bit previously requested for lines L–B4 and L–C7 respectively will appear and will at time *t*8 be entered into bit positions 6 of the control words for lines L–B6 and L–C9 respectively. During subsequent line scans these new bits are shifted to their proper control word positions in the same manner as the new bit, destined for line L–A1, being described.

*Occurrences 11–20 of t18 (Line Scan No. 2).*—During the second line scan, after the 13th appearance (third during this scan) of time signal *t*18, at time *t*11, the sixth bit position of the control word for line L–A3 is read from the serial memory 23 of multiplexing channel adapter MCA–A. (Note, that though the channel scanner CS is connected to terminal T–B, all three of the multiplexing channel adapters continue to function.) In FIGURE 3*b,* the trigger 76 is at time *t*11 set (to the "1" state) via AND circuit 71 to store the new bit (a 1-bit); and, at time *t*12 the trigger 76 contents are sent by AND circuit 78 into the serial memory 23 in bit position 8 of the currently written control word for line L–A2.

*Occurrences 21–30 of t18 (Line Scan No. 3).*—Similarly, during the third line scan, after the 22nd appearance of signal *t*18, at time *t*15, the contents of bit position 8 control word L–A2 are placed into the trigger 76 via AND circuit 72 and is, at time *t*16, transferred via AND circuit 79 into the control word for line L–A1, in bit position 10.

*Occurrences 31–40 (Line Scan No. 4).*—Again, during the fourth line scan, after the 31st appearance of signal *t*18, the contents of the control word for line L–A1 bit position 10 are transferred to bit position 2 ("emptied" as a result of blocking of AND circuit 352 when its contents were, at some previous time, sent on a line) of the same word via the AND circuit 73 to the trigger 76 at time *t*19 via the AND circuit 176 at time *t*20. This completes the transfer of the new bit associated with line L–A1 to bit position 2 of the control word for line L–A1.

*Occurrences 41 et seq. of t18 (Line Scan No. 5).*—During subsequent line scans, the control word for line L–A1 is repeatedly circulated within the multiplexing channel adapter MCA–A without change (since no new bits arrive) until during the tenth line scan the previously supplied new bit is, after the 91st occurrence of time *t*18, sent out on line L–A1 at *t*20. At this time a new bit (representing the third bit of the character being transmitted on line L–A1) is again requested for line L–A1 and all of the above operations are repeated.

It is of course understood that since a bit may be transmitted every time that a line is serviced, that a new bit may be requested from the message source 1 during every third occurrence of time signal *t*20. Thus during every line scan, it is possible for several new bits to be routed through the correction controls 30, only one of which is described in the operation.

There has been described apparatus operable to compensate for delays in supplying new data, which delays result in the association of the new data with unrelated information. The unrelated information is repeatedly interrogated, and the new data is moved in steps through the unrelated information until it is eventually associated with its corresponding information. It is a requirement that the time necessary to make the adjustment be less than the time between successive utilizations of information. This requirement is satisfied in many types of systems, for example in systems having information regularly available a plurality of times, only one of which times the information is utilized. A portion of the adjustment is then made during each time that the information is available, the adjustment being completed before the time that the information is utilized.

While the invention has been particularly shown and described with reference to the preferred embodiment thereof, it will be understood by those skilled in the art that the foregoing and other changes in form and details may be made therein without departing from the spirit and scope of the invention.

What is claimed is:

1. In a system wherein information groups containing data are repeatedly made available at a storage device prior to utilization of the data, including:

a source of new data, said new data destined to be stored in one of said groups;

combining means, connected to said source, for entering said new data into a currently available group, which group is separated from said one of said groups for which the data is destined by a fixed number of intermediate groups;

adjustment means, connected to said storage device, operable, during each availability of successive groups, to transfer said new data from one group to the next group, repetitively a number of times equal to said fixed number to thereby transfer said data into its destined group;

and means connected to said storage device, for utilizing said new data after it is entered into its correct group.

2. In an exchange system wherein words comprising bits are repeatedly available within the exchange prior to utilization of the words, including:

a memory for serially storing said words in bit positions, having an input for receiving bits and an output for supplying, after a fixed delay, bits received at said input;

logic means, interconnecting said memory input and output, for repeatedly circulating the words stored in said memory;

utilization means connected to said memory, for utilizing first fixed bits in each word once for every predetermined number of circulations of the words containing said fixed bits, and for requesting new bits as replacements for said first fixed bits;

a source of new bits connected to said utilization means, operable in response to said utilization means to supply a new bit a fixed time after each said request;

combining means, connected to said source and to said memory input for entering said new bits into second fixed bit positions of a word at a time when said second fixed bits are supplied to said memory input, which second fixed bit positions are not the positions of the correct word for which the new bits were requested;

and adjustment means, connected to said memory for transferring said new bits to the correct word, operable at a time when each of the fixed bit positions of successive words become available at the memory output to enter the bits into other fixed bit positions of adjacent words currently being stored in said memory input, repetitively a number of times determined by the number of words from the correct word that the new bits are displaced whereby said new bit is placed into the fixed bit position of the correct word for which it was supplied by said source.

3. In a message switching exchange wherein each one of a number of control words is associated with a corresponding one of a number of sequentially scanned message lines, each control word comprising a plurality of bit positions including a number of predetermined bit positions, at least one of which is allotted for holding a data bit for communication with the corresponding line, including:

a circulating delay line memory for holding control word bits entered at an input in synchronism with the scanning of the lines, and for supplying said control word bits at an output a fixed time after entry;

a logic circuit, connected to said memory input and output, for entering into said input after a fixed delay bits supplied at said input;

correction means, connected to said memory input and output, for immediately entering into said input, bits supplied at said output;

utilization means, connected to said memory input for communicating at fixed intervals predetermined data bits between the allotted control word positions currently being entered into said memory and the corresponding currently scanned lines, and for requesting new bits as replacements for the communicated data bits;

a source of new bits, connected to said utilization means and to said memory, operable in response to each utilization means request to supply to said memory input, after another line is scanned, a new bit which is entered into one of said predetermined bit positions of a control word other than said allotted position for which it was requested;

and recognition means, connected to said memory output and to said correction means, repeatedly operable upon the recognition of any of said predetermined bit positions, except said alotted positions, supplied at said memory output to make said correction means operable to immediately enter the bit contained in said position into another one of said predetermined bit positions in another control word currently being entered into said memory input, until said new bit is entered into the allotted bit position in the control word corresponding to the line scanned at the time it was requested.

4. Information element shifting apparatus, including:

a memory having a plurality of accessible positions each storing an information element;

output means, connected to said memory, for receiving information elements as accessed from positions in said memory;

input means, connected to said memory, for entering information elements into positions in said memory;

first transfer means, interconnecting said output means and said input means, selectively operable to supply information elements to said input means for entry into memory positions corresponding to the positions from which said elements were received by said output means;

second transfer means, interconnecting said output means and said input means, selectively operable to supply information elements to said input means for entry into memory positions displaced from the positions from which said elements were received by said output means;

and selection means, connected to said first and second transfer means and to said output means, normally operable to select said first transfer means, and operable upon the receipt by said output means of elements from preselected positions in said memory to cause said second transfer means to operate with respect to said elements from said preselected positions.

5. In combination:

a source for repeatedly presenting at an output sequentially positioned signals previously entered at an input, each of said signals being assigned to one of a plurality of first positions or to one of a plurality of second positions;

means, connected to said source, operable to transfer signals assigned to said first positions from said output to said input without change in positions;

first modification means, connected to said source, operable to transfer signals assigned to said second positions from positions presented at said output to said input in others of said second positions;

and second modification means, connected to said source, operable to transfer signals assigned to preselected ones of said second positions presented at said output to said input in preselected ones of said first positions.

6. In combination:

a source of repeatedly presented signals, each signal being assigned to one of a plurality of first and second time divisions;

input means, connected to said source, for supplying signals to said source;

output means, connected to said source, for receiving signals from said source;

circulation means, connected between said input means and said output means, for receiving signals assigned to first time-divisions and entering said signals into said source in the same time divisions as supplied;

first shifting means, connected to said input and output means, operable to shift signals at said output assigned to ones of said second time divisions to others of said second time divisions;

and second shifting means, connected to said input and output means, operable to shift signals at said output assigned to preselected ones of said second time divisions to preselected ones of said first time divisions.

7. Apparatus for ordering information, including:

a source for supplying a number of information representing signals arranged into a plurality of orders, the information represented by each signal being identified with one of said orders;

first means connected to said source for recognizing preselected ones of said orders some of which preselected orders contain, and some of which do not contain, signals representing information with which the orders are identified, said latter named orders being positionally separated from orders with which the signals are identified by a predetermined number of orders;

and second means, connected to said first means, operable to repeatedly transfer signals from said preselected orders which do not contain signals representing information with which they are identified to other preselected orders, a number of times equal to said predetermined number to thereby transfer the signals to the preselected orders with which their information is identified.

8. Apparatus for ordering information, including:

a memory for storing a number of information representing signals in a plurality of locations, the information represented by each signal being associated with one of said locations; the information represented by signals stored in specified ones of said locations not necessarily being associated with their location, said signals being separated from locations with which they are associated by a predetermined number of locations;

accessing means, connected to said source, for making the signals stored in said locations available;

first means connected to said memory for recognizing said specified locations as the signals stored therein are accessed;

second means, connected to said first means and to said memory, operable to transfer signals from said recognized specified locations not associated with the information represented by said signals to others of said specified locations;

and means for operating said second means repetitively a number of times equal to said predetermined number to thereby transfer the information in said specified locations from one specified location to the next, whereby said signals are finally stored in the location with which said signals are associated.

9. Apparatus for ordering information, including:

storage means for storing bits in a plurality of locations;

a source for supplying a number of information bits associated with particular locations in said storage;

means, connecting said storage and said source, for transferring bits from said source to a plurality of preselected locations in said storage initial ones of which are not associated with said bits, said initial preselected locations being separated from said particular locations by a predetermined number of preselected locations;

means, connected to said storage, for repeatedly circulating all bits stored in said storage;

first means, connected to said circulating means, for recognizing bits from said preselected and said particular ones of said storage locations;

second means, connected to said first means and to said storage, operable to transfer bits from said preselected storage locations not associated with information represented by said bits to other preselected locations;

and means for operating said second means a number of times equal to said predetermined number;

whereby said bits are eventually stored in said particular locations with which their information is associated.

10. In combination:

a first source of time-positioned elements;

a second source of time-positioned elements, some of which are desired to correspond with elements from said first source of elements;

means, connecting said first source and said second source, operable to merge the elements of said first source with said elements from said second source in a predetermined known positional relation with said elements from said second source, which position is displaced from the corresponding elements of the second source;

first means, connected to said second source, operable to vary the relative time-position of those elements merged from said first source with respect to the second source elements;

and second means, connected to said first means, for making said first means operable a predetermined number of times, depending upon the magnitude of displacement with respect to improperly merged first source elements, to thereby merge elements from said first source with their corresponding elements from said second source.

11. In combination:

a source of time-positioned elements;

order means for holding elements in a plurality of time-positioned orders;

means, connected to said source and to said order means, for initially placing each element from said source into an order a fixed number of time positions displaced from the time-position of the element in the source;

first means, connected to said order means, operable to displace the time-position of said elements relative to the orders in which they were initially placed by at least one element time-position for each actuation of said first means;

and second means, connected to said first means, for actuating said first means a number of times to thereby cause a total displacement of said elements in said order means equal to said fixed number of time-positions.

References Cited by the Examiner

UNITED STATES PATENTS

| | | | |
|---|---|---|---|
| 2,770,797 | 11/1956 | Hamilton et al. | 340—172.5 |
| 2,961,644 | 11/1960 | Gardiner | 340—172.5 |
| 2,968,027 | 1/1961 | McDonnell et al. | 340—172.5 |
| 2,978,679 | 4/1961 | Dieterich | 340—172.5 |
| 3,076,181 | 1/1963 | Newhouse et al. | 340—172.5 |
| 3,153,776 | 10/1964 | Schwartz | 340—172.5 |
| 3,163,850 | 12/1964 | Austin et al. | 340—172.5 |
| 3,166,668 | 1/1965 | Marsh | 340—172.5 |
| 3,167,646 | 1/1965 | Giroux | 340—172.5 |
| 3,202,972 | 8/1965 | Stafford et al. | 340—172.5 |

ROBERT C. BAILEY, *Primary Examiner.*

P. J. HENON, *Assistant Examiner.*